(12) United States Patent
Atzmon

(10) Patent No.: US 8,130,197 B2
(45) Date of Patent: Mar. 6, 2012

(54) FLOATING KEYBOARD

(75) Inventor: Jack A. Atzmon, Englewood, NJ (US)

(73) Assignee: Ergowerx. LLC, New York, NY (US)

( * ) Notice: Subject to any disclaimer, the term of this patent is extended or adjusted under 35 U.S.C. 154(b) by 842 days.

(21) Appl. No.: 11/377,072

(22) Filed: Mar. 15, 2006

(65) Prior Publication Data

US 2006/0210340 A1     Sep. 21, 2006

Related U.S. Application Data

(60) Provisional application No. 60/661,652, filed on Mar. 15, 2005, provisional application No. 60/681,877, filed on May 16, 2005.

(51) Int. Cl.
*G06F 3/02* (2006.01)
*G09G 5/00* (2006.01)

(52) U.S. Cl. ....................................................... 345/168

(58) Field of Classification Search ........ 341/22
See application file for complete search history.

(56) References Cited

U.S. PATENT DOCUMENTS

| | | | | |
|---|---|---|---|---|
| 5,021,640 A * | 6/1991 | Muroi | ................... | 235/462.13 |
| 5,228,791 A * | 7/1993 | Fort | ................... | 400/489 |
| 5,541,593 A * | 7/1996 | Arsem | ................... | 400/682 |
| 5,564,844 A * | 10/1996 | Patterson et al. | ................... | 400/492 |
| 5,566,913 A * | 10/1996 | Prokop | ................... | 248/118 |
| 5,659,307 A * | 8/1997 | Karidis et al. | ................... | 341/22 |
| 5,735,618 A * | 4/1998 | Gluskoter et al. | ................... | 400/472 |
| 6,133,556 A * | 10/2000 | Ramsey et al. | ................... | 219/521 |
| 6,466,201 B1 * | 10/2002 | Koizumi | ................... | 345/168 |
| 6,887,004 B1 * | 5/2005 | Hogle et al. | ................... | 400/679 |
| 6,898,299 B1 * | 5/2005 | Brooks | ................... | 382/115 |
| 7,312,791 B2 * | 12/2007 | Hoshino et al. | ................... | 345/173 |
| 2002/0070922 A1 * | 6/2002 | Zarek | ................... | 345/168 |

* cited by examiner

*Primary Examiner* — William Boddie
(74) *Attorney, Agent, or Firm* — Cozen O'Connor

(57) ABSTRACT

An ergonomic keyboard that alleviates repetitive stress injuries by eliminating static repetition in the use of keyboards. The keyboard includes a plurality of key zones, the key zones being adapted to move. The zones are moved by moving means. The key zones move when any one or more of predetermined conditions occur such as a set time, number of keystrokes, time interval, keystrokes in a zone or area, preprogrammed injury status, preprogrammed injury prevention, programmed diagnosed condition, key temperature, keyboard vibration, manual adjustment, and user pattern or preference.

23 Claims, 11 Drawing Sheets

Prior Art

Prior Art

Prior Art

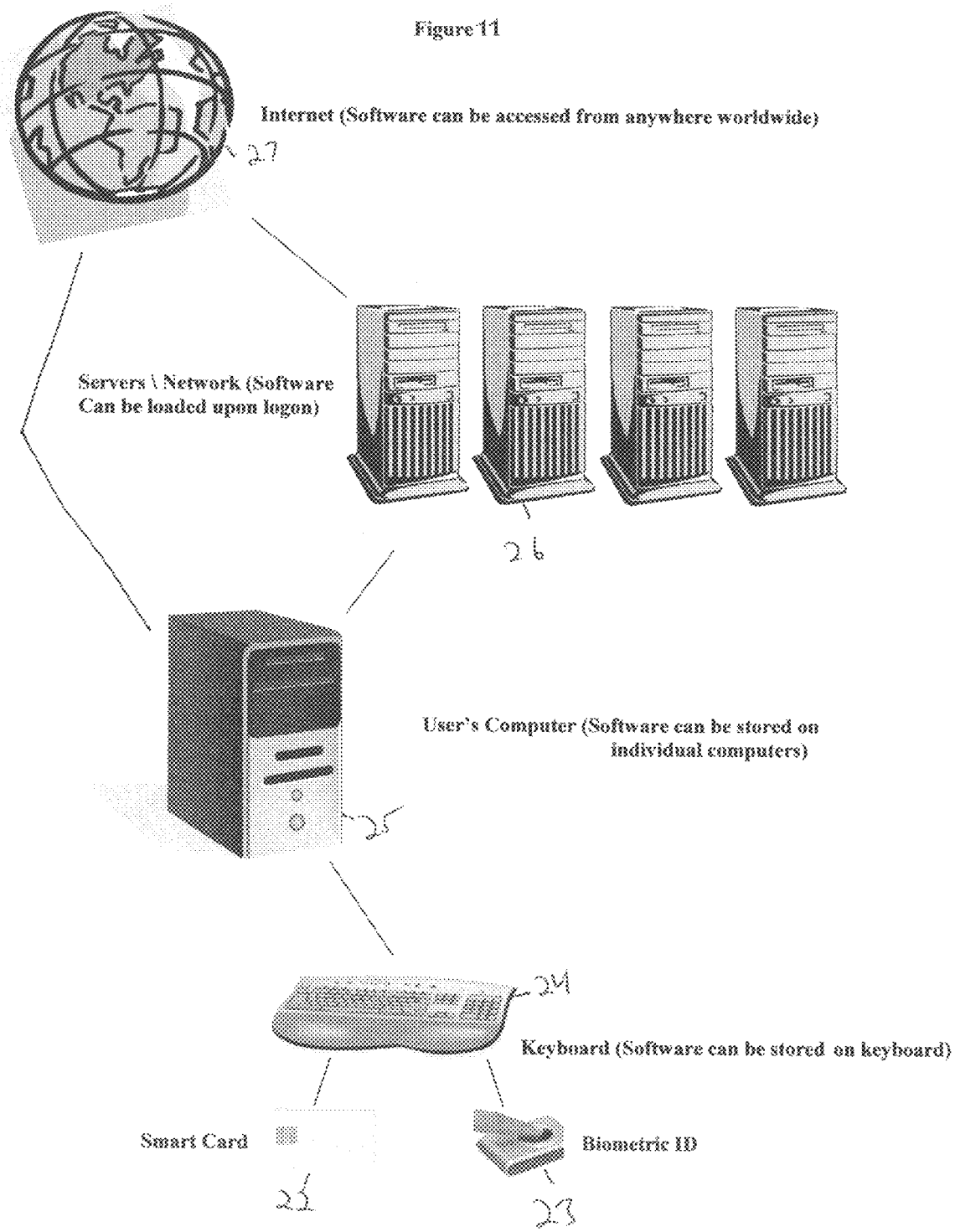

FLOATING KEYBOARD

CROSS-REFERENCE TO RELATED APPLICATIONS

This application claims priority to provisional application Ser. Nos. 60/661,652 filed Mar. 15, 2005, and 60/681,877 filed May 16, 2005, the entirety of both incorporated herein by reference.

FIELD OF THE INVENTION

This invention relates generally to human work environments and particularly to ergonomic workstations.

BACKGROUND OF THE INVENTION

One of the consequences of the technology in the workplace has been the emergence of highly specialized machines and machine control environments. These machines and machine controls such as computer controlled systems have greatly increased the productivity and efficiency of workers by grouping substantial operative and control functions within a single compact environment minimizing the amount of movement and travel required by the worker to control diverse and complex functions. As workplace architects and creators have endeavored to further increase the effectiveness and efficiency of workers, greater numbers of controls and functions have been more densely grouped into smaller and smaller workspace type areas often referred to as workstations. Such work stations have achieved considerable variation and have included manufacturing system control facilities, computer work stations for information process, secretarial and administrative office environments as well as other facilitates throughout much of the modern industrial scene including inspection and fabrication stations, on assembly line type facilities, or the like.

While such highly efficient and compact workstation environments have greatly increased worker productivity and efficiency, the burdens imposed upon the worker in a workstation environment, which essentially limits the ranges of motions, muscle group changes, postural changes, and rest needed, by the worker. This environment has given rise to substantial risks of injury and other problems to the users of these workstations.

In particular, the tendency for such work stations to utilize a restricted seating portion for the worker and the manipulation of densely compacted controls such as a computer keyboard or the like has given rise to a variety of maladies such as the well known carpal tunnel syndrome as well as a variety of musculo-skeletal ailments generally referred to as repetitive motion syndrome.

One of the most common examples of such problems is the painful injury which often afflicts those operating computer keyboards for extended periods of time as the repeated high speed limited motion of the computer operator's fingers in a fixed keyboard position which gives rise to the carpal tunnel syndrome type injury.

Practitioners in the art have endeavored to provide workstation environments that are more ergonomic and provide improved support and adjustability of the operating environment to suit the physical dimensions and characteristics of the operator. Practitioners have provided work station environments in which the user is able to adjust the various operating dimensions of the work space environment such as the table height, the keyboard height, the height of footrest and chair seating surfaces as well as the angle of chair back supports and the distance to the worktable and so on.

For example, U.S. Pat. No. 5,098,160 discloses an ergonomic seating system apparatus that includes a linear alignment member with an interconnected seating device such as a chair. An adjustable footrest is provided in combination with the linear adjustment and alignment member. The chair and linear alignment member and footrest are positioned with respect to a workplace environment such as a desk and computer. The user is able to adjust the chair position and height as well as the footrest height independently to optimize the ergonomic position for the user. This type of device still limits needed variation in position and other adaptations for the user that could alleviate or avoid injury.

U.S. Pat. No. 4,779,922 discloses a work station system in which a planar base supports a multiply articulated chair having an angularly movable backrest and various adjustable independently movable support pads and surfaces. An angularly movable support is coupled to the chair and includes a computer monitor and keyboard all capable of independent adjustment. This type of device still limits needed variation in position and other adaptations for the user that could alleviate or avoid injury. This device also lacks user guidance to optimal positioning and limits adaptation to user only initiated positioning.

U.S. Pat. No. 5,106,141 issued to Mostashari sets forth a motorized mobile office for use in a van-type vehicle or the like. The interior of the van is configured to receive and support a complete workstation including a support chair and a computer keyboard support with additional surrounding work surfaces. This type of device still limits needed variation in position and other adaptations for the user that could alleviate or avoid injury. This device also lacks user guidance to optimal positioning and limits adaptation to user only initiated positioning.

U.S. Pat. No. 5,122,786 sets forth an ergonomic keypads for desktop and armrest applications in which a pair of left and right ergonomic keypads are separately positioned on a desktop or armrest of a chair to permit the user to operate the keypads while assuming a more comfortable and natural hand and wrist position. The separate keypads may be hingedly interlockingly to function as a compact unitary keyboard for desktop use.

U.S. Pat. No. 4,585,363 discloses a therapeutic aid for use by a patient in developing fine, medium and gross arm movements. The device includes a pair of elongated adjustable length arms pivotally coupled at their junction and securable at one end to a chair backrest or the like. A pen or other therapeutic apparatus may be secured to the remaining end of the pivotal arm combination and serves as a guide for arm and hand movement on the part of the user. This type of device still limits needed variation in position and other adaptations for the user that could alleviate or avoid injury. This device also lacks user guidance to optimal positioning and limits adaptation to user only initiated positioning.

U.S. Pat. No. 20020041785 sets forth a workstation that includes a worktable and chair defining workstation geometry. A plurality of adjustable elements is utilized within the workstation to facilitate variation of the workstation geometry. A controller is coupled to the adjustable elements of the workstation to apply a gradual long-term motion profile signals to the adjustable elements of the workstation. The work station geometry is varied in response to the imposition of the motion profile signals upon the adjustable elements of the work station to provide substantially imperceptible changes of the work station operator's physical position to avoid or minimize the many maladies associated with restricted or limited motion operation within work stations. Further, a continuous passive motion keyboard is provided that changes the keyboard position relative to the keyboard user. While this keyboard may move it is not interactive, it lacks the ability to make regular specific movements based on workload or time spent working. This keyboard does not monitor the user to produce a safer environment, it just moves at intervals unrelated to the input or stress of the user from the task. This causes unnecessary interruptions at random intervals to the worker without any guarantees of benefit. It also limits adaptation to movement only and no customization of such movement is available.

FIG. 1 shows a manually positionable ergonomic keyboard by use of a plastic crankshaft. It is clumsy and difficult to use. The user is given no indication on when if or how much to move the board. The keyboard is unable to guide the user to position it optimally. Additionally no attention at all is given to static loading, a requirement to carpal tunnel/repetitive strain injury. Additionally, the lack of a corresponding wrist rest allows wrist hyperextension. This type of device still limits needed variation in position and other adaptations for the user that could alleviate or avoid injury. This device also lacks user guidance to optimal positioning and limits adaptation to user only initiated positioning.

FIG. 2 is another ergonomic keyboard. This keyboard is split and manually moveable in a tenting and splaying motion. This keyboard is not motorized or sensored. It offers no way to guide the user to the best keyboard positions. A manual adjustment mechanism is used so for the user can decide on the best course of treatment. There is no adaptation at all to address repetition a key component to carpal tunnel syndrome and repetitive stress injuries. This type of device still limits needed variation in position and other adaptations for the user that could alleviate or avoid injury. This device also lacks user guidance to optimal positioning and limits adaptation to user only initiated positioning.

FIG. 3 shows a stationary ergonomic keyboard. There is no human adaptation at all. The keyboard does not alter its position at all. There is no attention or adaptation for different sized users, different injuries or environments. This keyboard fails to address most of the needs of carpal tunnel and repetitive stress injury sufferers. In fact, it does nothing to address the chief cause of carpal tunnel and repetition strain injury, repetition itself.

While the foregoing described prior art devices have provided improvement over fixed inflexible work station environments or ordinary flat keyboards, there remains a continuing need in the art for work station environments and apparatuses that provide further attention to the physical needs of the user and which protect the user more substantially against the limited motion and confined motion types of injuries such as carpal tunnel syndrome or repetitive motion syndrome. Such improvements would include programs that detect the user's needs and act accordingly.

SUMMARY OF THE INVENTION

An ergonomic keyboard that alleviates repetitive stress injuries by eliminating static repetition in the use of keyboards. The keyboard includes a plurality of key zones, the key zones being adapted to move. The zones are moved by moving means. The key zones move when any one or more of predetermined conditions occur such as a set time, number of keystrokes, time interval, keystrokes in a zone or area, preprogrammed injury status, preprogrammed injury prevention, programmed diagnosed condition, key temperature, keyboard vibration, manual adjustment, and user pattern or preference. A keyboard and or mouse or similar input devices used mainly with computers as a therapeutic and palliative instrument for injuries like carpal tunnel syndrome and repetition strain injury is disclosed. The keyboard, mouse, trackball, or other device is preferably programmed through the computer or onboard programming to move in sequences. This keyboard would be able to monitor the user's workload related to keyboard, mouse, or other input peripherals. In a preferred embodiment, this keyboard senses where and how changes could be made to protect the user from injury. This keyboard then executes these changes automatically. These programmed sequences would change in order to alleviate specific conditions like carpal tunnel. Changing positions and other adaptations in timed intervals, or other parameters as discussed above would assist the user by altering the position of nerves, change the blood flow, and interrupt static loading to certain muscle groups, ligaments, tendons, and nerves during the task of using these devices. This movement would diminish the affect on any one area of the body and allow the injured or affected area to be less involved in the task of using the devices, or improve the function and environment of the at risk area resulting in a state of rest and recuperation the motion sequence increases the chance of alleviating the condition. The device would, through the use of a master control program in the keyboard, computer, server or wireless control device, be able to alleviate specific conditions or go through a general movement program whereby the keyboard and or mouse changes positions when work load parameters are met to help prevent conditions exacerbated by or caused by the use of these and other input devices. Motors or other devices would move the keyboard and mouse or other input devices. In addition the keyboard, mouse and other devices may have sensors to help track and change adaptations as necessary or to accumulate data.

Adaptations include, but are not limited to, position, movement, of the keys, keyboards, wrist support or multiple zones within a keyboard. Temperature changes to the keys, wrist rest including cooling and warming to circulation and provide comfort. Key height and tension can preferably be altered targeting specific zones that are overused for instance providing less strain to overused finger and wrist muscles. In one embodiment, the keyboard includes a wrist support where the wrist tractions. The wrist support preferably includes a temperature control to cool or warm the wrist support to optimal levels for the user.

A therapeutic/or ergonomic keyboard and mouse or similar input devices used mainly with computers is disclosed. The Keyboard and mouse or trackball or other devices is programmed through the computer or via controls located on the device itself to move the device in sequences or random movements. These sequences or movements are programmed to vary positions. This would alleviate specific conditions like carpal tunnel, or repetitive strain injury. By changing positions in timed, random, or other parameters including but not limited to keystroke count, temperature, measured accumulation of pressure or set intervals positions, or when work load parameters are met to help prevent conditions exacerbated by or caused by the use of these and other input devices. It would assist the user by incorporating more muscle groups. These changes would allow the injured or affected area to be less involved in the task of using the devices, go into a state of rest and recuperation and increases the chance of alleviating or preventing the condition. The deliberate pattern of changes and keyboard motion could diminish the adverse affects on the user in a specific way. For instance movement could be programmed to alleviate overuse to a specific anatomical area like a specific muscle group. The keyboard would maneuver in a way to alleviate an injury to one of the hands by moving a specific are or zone on the keyboard related to the injured hand or wrist. Movements would be programmed to accomplish certain palliative tasks, for instance the keyboard can arrange itself in a way to decompress the median nerve that is usually compressed with a typical keyboard. Stretching out the wrist with the wrist support and altering key angle to optimal position could do this. Additionally the keyboard and or wrist guard could alternatively cooled and warmed to further affect blood flow and decrease pain to the area. This allows the injured or affected area to be optimally adapted to the user and increases the chance of alleviating the condition.

The device, through the use of a master control program in the computer or through an on board control device, alleviates specific conditions or oscillates through any number of movements during a time period to help prevent conditions exacerbated by or caused by the use of these and other input devices. At least one motors or other device moves the keyboard, mouse, or other input devices. In addition, the keyboard, mouse, and other devices preferably have sensors to help track and change position as necessary or just to accumulate data.

In one embodiment, this device is controlled through an on board controller. The controller is located on the device or, alternatively, in the keyboard itself, on the computer, solid state memory chip, or on the server or embedded on the logon program or through the World Wide Web. Communication takes place between the controller and the keyboard via a WIFI connection, Bluetooth, RS232, USB, firewire, serial communication, parallel communication, or the like. The controller preferably has options such as velocity changes, height change limitations and the like, activated by switches, sensors, on the like. In one embodiment, the device is controlled remotely or by other means either located on board, in the computer, or on a server.

The keyboard or mechanism is preferably split into a plurality of zones, where a zone includes the keys surrounding the key being used, the zone itself would then move and change when use parameters are met. The keyboard or mechanism would have any number of zones. In one embodiment, the zones are variably sized. The zones will move according to the use of that zone. In this way, the keyboard is suited to make changes necessary to engage the small bones of the wrist and fingers and the small muscles, tendons and ligaments utilizing programming on the keyboard as well as on the pc, network, server, internet, and the like.

In one embodiment, the keyboard changes the environment to suit the user's needs. It also monitors the user's needs to tailor the output as necessary. In one embodiment, the keyboard moves using motors with or without gears, pneumatics, hydraulics, magnetic pull, and assorted other mechanisms and technologies.

Those skilled in the art can use materials to make this keyboard including but not limited to Plastics, rubber, metal alloys, or even a projected image on a moving surface. The sensing apparatus monitors compliance and use patterns with keystroke weight, vibration, infrared motion detection, heat sensors, or a mat under the keyboard sensing accumulated weight or vibration, and the like. A variety of power sources power the keyboard including USB power from the computer or other connection capable of carrying or transmitting power, power and data together and rechargeable and not rechargeable batteries, solar power, AC or DC powered, power cell technology, and the like.

Several types of movement are possible including splaying of the hands, hand/wrist/forearm rotation, flexion, extension, pronation, supination, and other desired movement to avoid injury. The keyboard is programmed to move, change or adapt using a keyboard based mechanism such as a circuit board built into the keyboard, a program on the pc, a program on the server, a program on the Internet a program on a wireless device, solid state memory chip or the like.

Various means are used to identify users and link those users to their preferably individualized keyboard movement program including biometrics, smartcards, passwords, and other unique identifiers.

Any one of several parameters prompt movement, including number of keystrokes, accumulated motion, time, weight, vibration, or the like.

It is the particular object of the present invention to provide an improved workstation that tends to minimize or prevent injury to the user resulting from limited and repetitive motion, static loading, accumulated stress to the body parts used in keyboarding.

It is the object of this invention to present an artificially intelligent, interactive design that is passively compliant. No action is needed by the user to make biomechanical adjustments to the keyboard to avoid injury. The programs are preferably automated and require no action to comply with the improved system. The keyboard is capable of learning the user's needs and making appropriate changes in order to help prevent injury to susceptible body parts engaged in typing.

DESCRIPTION OF THE DRAWINGS

FIG. 10 is another embodiment of the invention.

FIG. 11 sets forth a preferred embodiment of the software system.

DESCRIPTION OF THE PREFERRED EMBODIMENTS

Figure 1:
FIG. 1 Is an embodiment of a manually positioned ergonomic style keyboard.
Figure 2:
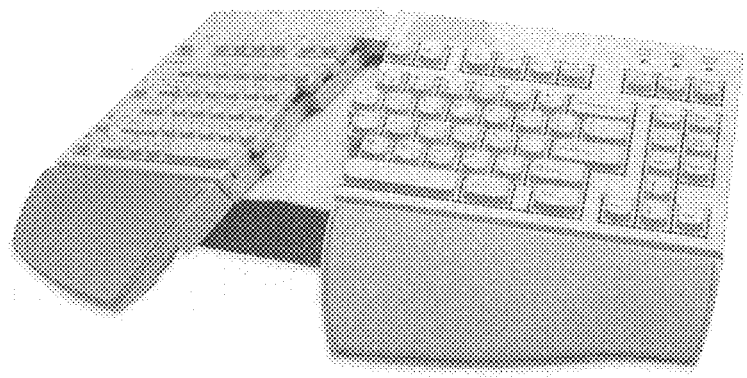
FIG. 2 Is an embodiment of a manually positioned ergonomic style keyboard.
Figure 3:
FIG. 3 Is an embodiment of an ergonomic style non-movable keyboard.
Figure 4:
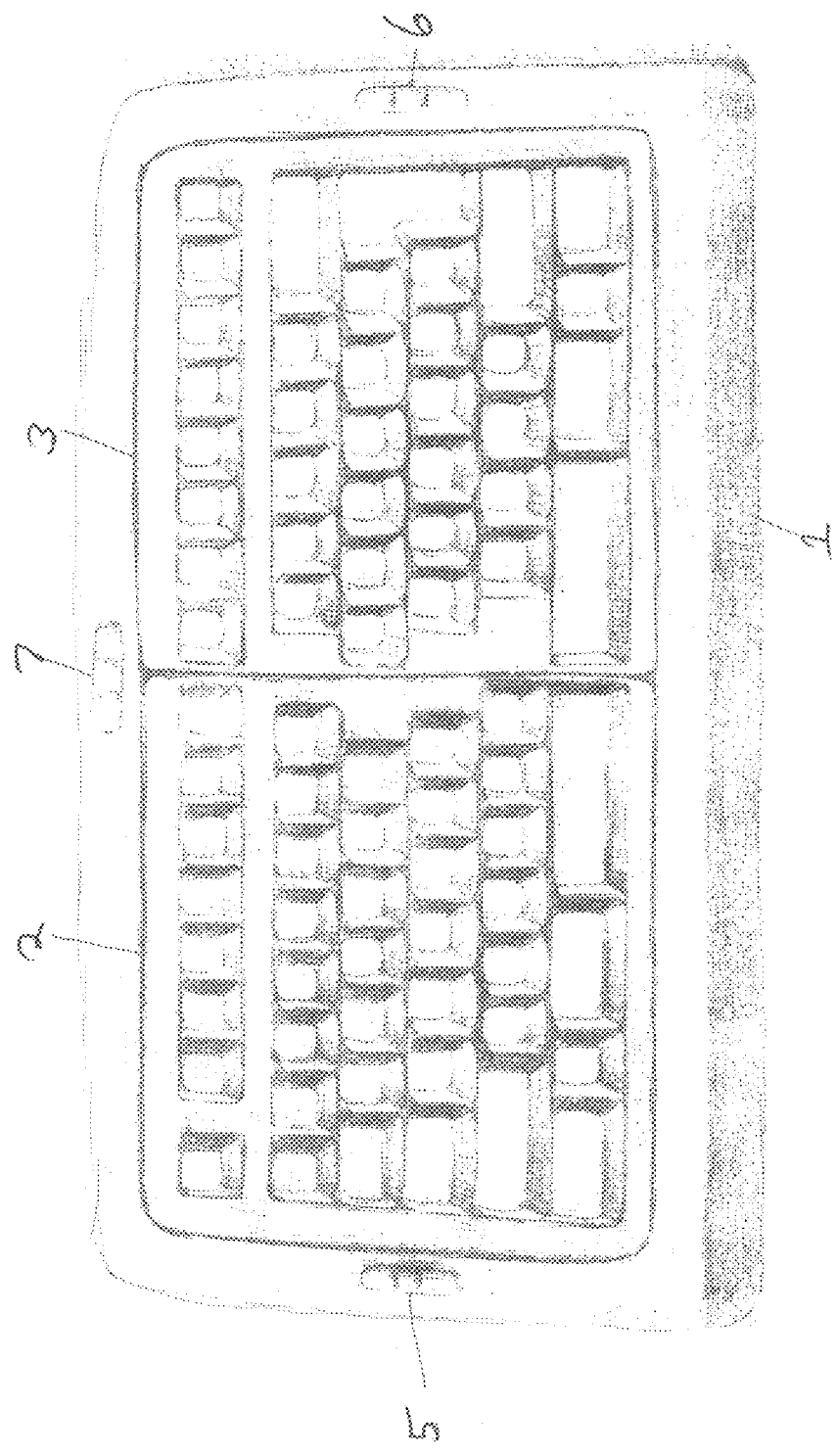
FIG. 4 is a top view of a motorized split keyboard.
Figure 5:
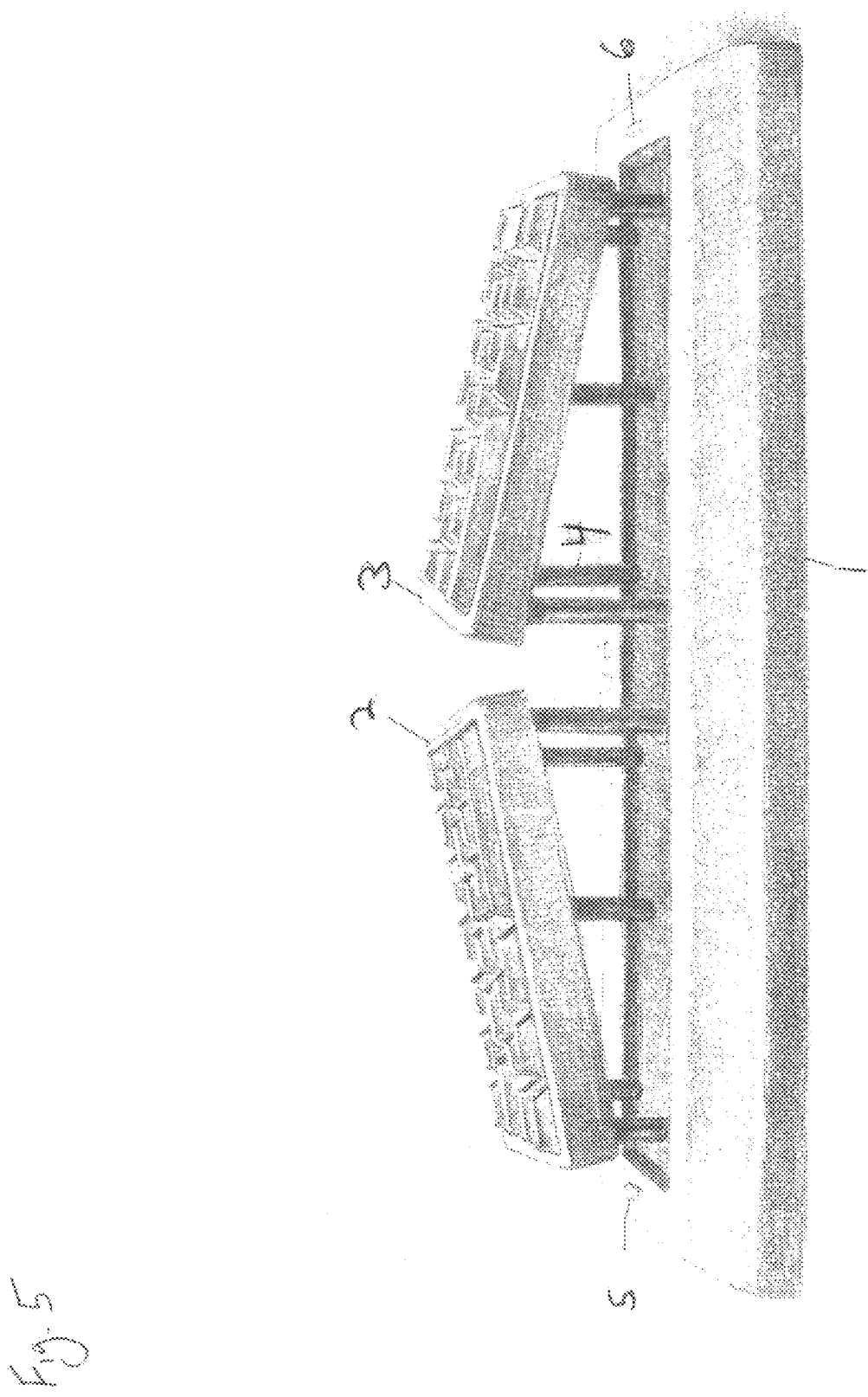
FIG. 5 is a side view of a split-motorized keyboard.

FIGS. 4 and 5 depict a split keyboard 2, 3 resting in a shell 1. Both halves of the keyboard 2, 3 have a plurality of legs 4 that extend and retract to produce movement. The legs are motor and or shaft driven and can move about 3 inches. Movements include supination, pronation, flexion, extension, rotation, as well as other movements. In one embodiment, each leg is individually controlled and able to make almost unlimited variations of changes and angles with the keyboard, depending on the needs of the user. In one embodiment, the base has moving components that move the keyboard zones.

A program that controls the keyboard could preferably be alerted to a specific condition of the user such as a left sided median nerve entrapment. The keyboard would then make an automatic deliberate set of changes to optimize the keyboard for that condition. The keyboard preferably identifies each user with biometrics, password, smart card technology, or other unique identifiers. In this way each user has their own profile, and the keyboard knows the last position, keystroke and history of the user and preferably engages that user's profile automatically.

In one embodiment, sensors or timers measure actual movement of the keyboard or keystrokes and controls how much the legs move. Preferably, there is an on/off switch 5 and a user skill level switch 6 as well as a switch 7 to control which side of the keyboard or if both sides remain active. The movement can be deliberate or change automatically over time based on usage or other programming, and can be gradual as to not interfere with usability. Asymmetrical movements are also available in one embodiment. On board control, pc control, or server control is utilized. In one embodiment, a graphical interface would be available on screen or on the keyboard. Alternatively a digital display would be available on the keyboard itself. This way the user could confirm the profile is his and how soon or how much the key board will be changing as well as see how much work has been done so far by keystroke or time or other indicators.

Figure 6:
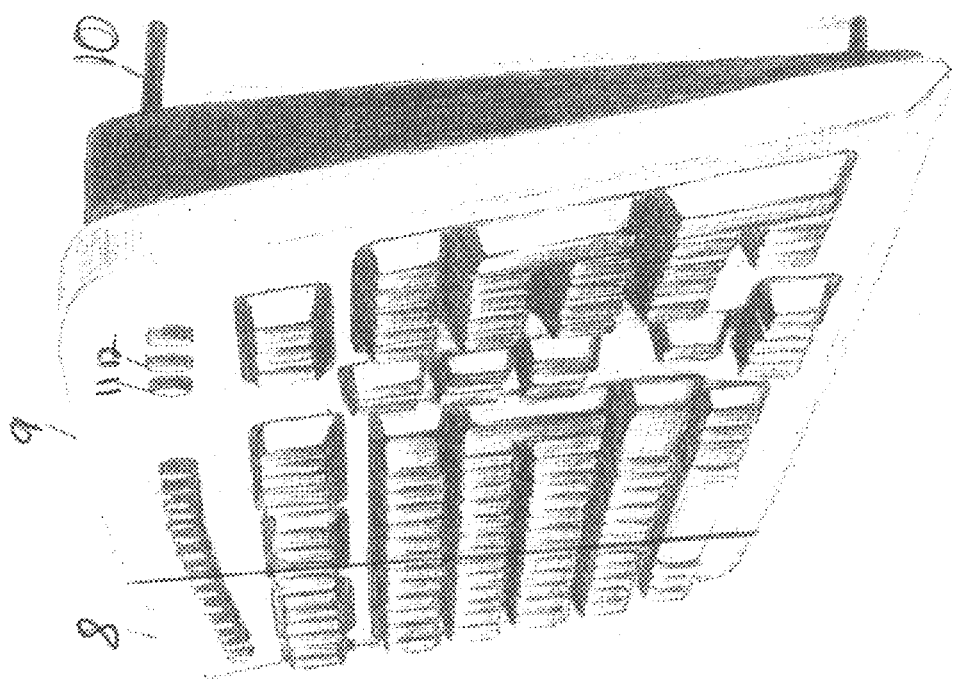
FIG. 6 is a side view of an embodiment of the invention with legs extended.
Figure 7:
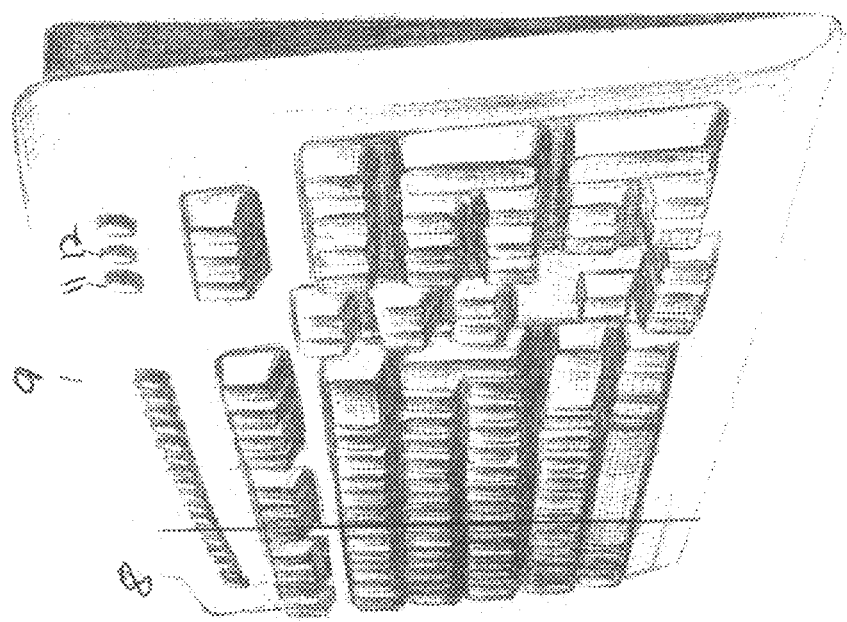
FIG. 7 is an embodiment of the invention with legs extended in an asymmetrical position.

FIGS. 6 and 7 depict a split keyboard where there are no outer shell only two halves 8 and 9. Each half articulates and moves. Legs 10 are motor and/or shaft driven and can move about 3 inches or more. Movements produce hand or wrist supination, pronation, flexion, extension, and rotation as well as other movements. Sensors or timers measure the actual movement and controls how much the legs move. There is an on/off switch 11 and a user skill level switch 12. The movement can be deliberate or change automatically over time based on usage or other programming, and can be gradual as to not interfere with usability. Asymmetrical movements are also available in this embodiment. On board control, pc control, server control can be utilized by those skilled in the art to sense and adapt to the users needs. Magnetics, hydraulics, pneumatics and other techniques can also be used to attain movement.

Figure 8:
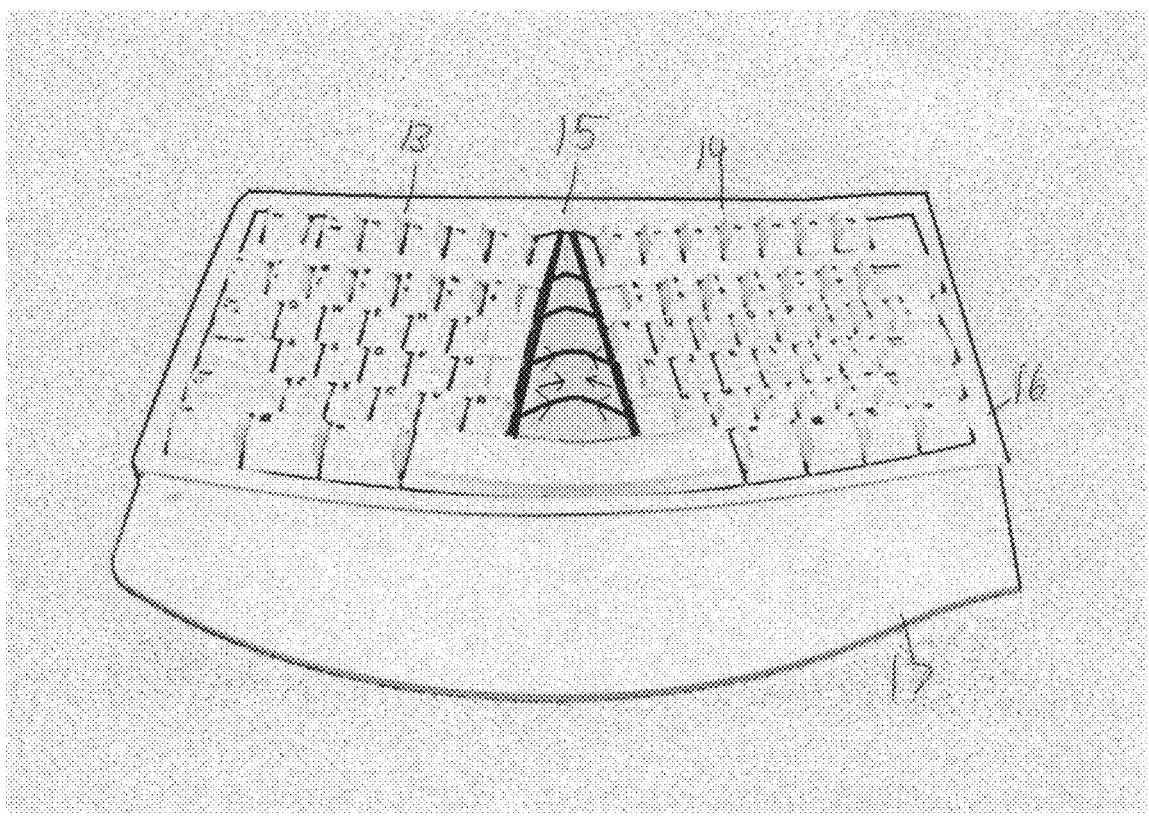
FIG. 8 is an embodiment of the invention with the ability to move in two planes, rotation, and splaying.
Figure 9:
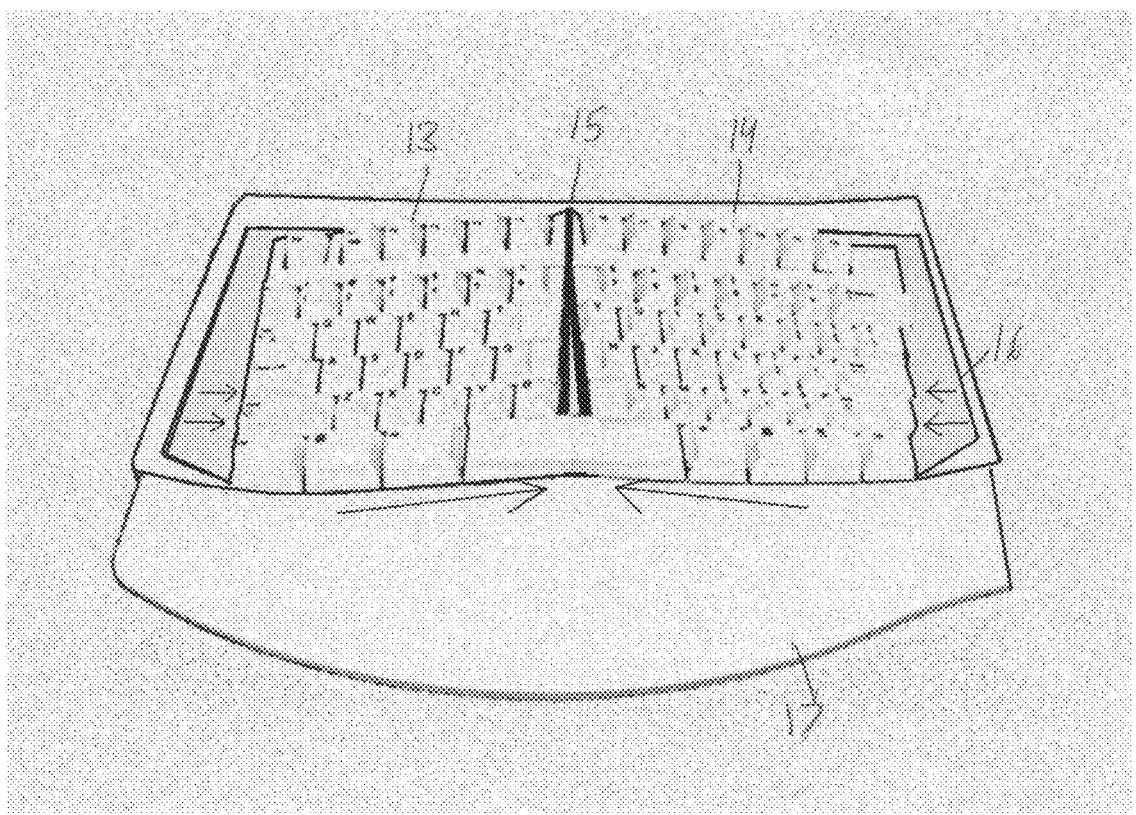
FIG. 9 is an embodiment of the invention with the ability to move in two planes, rotation, and splaying.
Figure 9:

FIGS. 8 and 9 set forth an embodiment of the keyboard mechanism with two split components 13 and 14. The components sit in a shell 16 that, in one embodiment, ascends toward the middle. The motor preferably sits in the middle of the keyboard 15 under the highest area or in the topmost section of the keyboard. The two halves are pulled and pushed along this surface with guides and gears, pulleys, magnets, and the like to accomplish splaying, (FIG. 8), rotation (FIG. 9) and elevation. Movements produce supination, pronation, flexion, extension, and rotation in the hands and wrists as well as other movements. Sensors or timers measure the actual movement and controls how much the legs (attached to gears) and in turn, the sections of the keyboard, move. The movement can be deliberate or change automatically over time based on usage or other programming, and can be gradual as to not interfere with usability. Asymmetrical movements are also available in this embodiment. On board control, pc control, server control can be utilized by those skilled in the art. The wrist rest 17 also is movable and can produce pressure changes as well as vibratory massage and temperature changes to help alleviate conditions to the area of concern.

Another embodiment of the keyboard mechanism has multiple split components. In other words, there are a plurality of keyboard sections, each section being independently moveable. The components sit in a shell that has multiple peaks between the components. The motor preferably sits in the middle of the keyboard under the most ascended area or in the topmost section of the keyboard. The multiple split components are pulled and pushed along this surface with guides, pulleys, and gears to accomplish splaying, rotation and elevation. Movements include supination, pronation, flexion, extension, and rotation as well as other movements. Sensors or timers measure the actual movement and controls how much the legs and in turn, the sections of the keyboard, move. The movement can be deliberate or change automatically over time based on usage or other programming, and can be gradual as to not interfere with usability. Asymmetrical movements are also available in this embodiment. The movement can be deliberate and change automatically over time based on usage or other programming, and can be gradual as to not interfere with usability. On board control, pc control, server control can be utilized by those skilled in the art.

In another embodiment, semi solid materials are used for the keys that undulate and move through the uses of electrostatic current. The multiple split components are pulled and pushed along this surface with guides, gears, pulleys, magnets, and the like to accomplish splaying, and rotation. Movements include supination, pronation, flexion, extension, and rotation as well as other movements. Sensors or timers measure the actual movement and controls how much the legs move. Asymmetrical movements are also available in this embodiment. On board control, pc control, server control can be utilized by those skilled in the art.

Another embodiment of the keyboard mechanism split into multiple sections consisting of two or more sections. The sections are all substantially on an underlying surface of the keyboard, which elevates towards the middle and towards the outer edges, and descends towards the front. Legs attach the keyboard sections to underlying gears. Multiple gears, and multiple motors, if necessary, allow the sections of the keyboard to move either as a group or individually to each area of the underlying surface. This allows for splaying, rotation, elevation, and declination of each section of the keyboard either individually or separately. The movements can be customized for each user separately, and the design allows for a large number of configurations. The movement can be deliberate or change automatically over time based on usage or other programming, and can be gradual as to not interfere with usability. On board control, pc control, server control can be utilized by those skilled in the art.

Another embodiment of the keyboard mechanism split into multiple sections consisting of two or more, where each section is sitting on a motorized pivot in the center. This allows for all degrees of motion in every possible angle on every plane. The movements can be customized for each user separately, and the design allows for a large number of configurations. The movement can be deliberate or change automatically over time based on usage or other programming, and can be gradual as to not interfere with usability. On board control, pc control, server control can be utilized by those skilled in the art.

Another embodiment of the keyboard mechanism, where in addition to the movements described above, the wrist rest in front of the keyboard will have the ability to elevate and descend, change temperature and vibrate and to adjust wrist position in relation to the keys. This can be done based on programming or manual control, and will be accomplished by a motor or gearing or other mechanisms under the wrist rest which, attached to gears, will allow legs underneath to raise and lower the wrist rest.

It will be apparent to those skilled in the art that the imbedded software will be able to make changes randomly or based on programming for a specific ergonomic issue or a specific user. The changes will be gradual or immediate depending on the settings and can be customized for different users.

The software will preferably include, but not be limited to programming aimed at relieving or preventing a specific disease such as carpal tunnel or other ailments due to repetitive motion. The gradual movements of the keyboard sections eliminate repetitive motion from the same angle improving blood flow, changing position of the median nerve, and resting overworked muscles.

The software programming will preferably monitor repetitive motion on specific keys and adjust the keyboard sections accordingly. If a user is constantly focusing on one small section of the keyboard, then the programming will adjust that section accordingly, moving it more frequently, or various other angles.

The software can be stored on the keyboard itself, the computer to which it is attached, a third party computer or a server on the network, a dedicated hardware controller, or on an external source such as a key card or a USB memory card, solid state memory or other storage mechanisms.

In one embodiment, the customization of the software can be manipulated by use of pre-programming, settings stored on the computer or server or by user input. The configuration changes can be made automatically when the user logs the computer into the operating system. It can also be automatically configured with the help of biometrics or their personal key cards or identification cards. Once the user is identified, the software, wherever it is stored, can adjust the keyboard for that specific user.

Biometrics or key card access, which could be imbedded in the keyboard, could assist or even replace the logon process. Logon and keyboard manipulation can be accomplished is one step if desired. For this configuration, drivers for the keyboard will be loaded upon startup, as opposed to upon login to the operating system.

Another embodiment could offer key and wrist rest temperature changes in addition to the other mentioned adaptations to alleviate common hand and wrist and arm ailments.

Another embodiment could offer key tension and height to change pressure to the muscle groups of the hand and wrist and offer changes to alleviate painful conditions of the hand.

Another embodiment offers central, or local monitoring of program compliance. The programs mentioned could be disabled by the user, If they are disabled the program would notify the centralized compliance monitor. The user as well as reminders would then automatically generate messages to encourage compliance. This program would maintain records of each keystroke made with the system engaged and not engaged. These records would be stored in a secure file or server and can be referenced in a report form for use as a legal document. Global use programs would also be available to see how as compliant the group or company is.

Another embodiment would have the sections of the keyboard light up in a fashion to alert the user that movements and adaptations were occurring.

FIG. 9 sets forth an embodiment having a motor and gearing in a cylinder hinge. The hinge is located between two halves 19 and 20 of the keyboard. The motor is controlled by previously mentioned mechanisms. An on board on/off switch is also built in. As the motor engages, it would cause the hinge to rotate elevating the center of the keyboard.

In one embodiment, the keyboard has a sleep or shut down mode where the keyboard recognizes inactivity and ceases operation, waiting for the keyboard to be reactivated. In this way position changes will only occur when the user is typing. This insures that the user will benefit from each action the board takes and therefore the user will benefit from a precise non-random regiment.

Another embodiment offers on screen or on board digital and or graphical display of the user/keyboard status. Anticipated or movements occurring will be visible in addition to key stroke count, finger temperature and other info pertinent to keyboard interaction.

Another embodiment would use all previously mentioned programming with a projected or imprinted keyboard to a cushioned or rubberized or other type of surface that would move in ways not encumbered by physical keys. It could be a water or air filled device or other material that would shift and change temperature, position as required and previously mentioned. Alternatively, the keyboard is moved using piezoelectric elements, or the like.

FIG. 11 sets forth a preferred embodiment of the software system. Identification of each individual user would be accomplished using smart card technology 22, biometric identification 23, or other identifiers attached to the keyboard 24 or computer 25, like a password. The keyboard could have on board technology and programming. Alternatively, programming would be available through the PC 25 and have the data stored there or on a server 26. Wireless device communicating with the keyboard could also house the programming.

In one embodiment, the keyboard 24 is coupled to the computer 25. The computer 25 is coupled to a server 26 via a connection. In one embodiment, the computer 25 is connected to the server 26 via the Internet 27. A user preferably logs onto computer 25 or keyboard 24 so that a customized articulation of the keyboard is implemented. In a preferred embodiment, a program that controls the keyboard is resident in the keyboard, i.e., the keyboard includes an ASIC, microcontroller, circuitry, or the like to control the keyboard. Alternatively, the program is stored on the computer 25 or network 26. It should be noted that the connections can be wireless or wired.

In operation, the program monitors the keyboard activity of the user and articulates the keyboard in response to the user's activity. It should be noted that while keystrokes represent activity, time of use is preferably monitored. In other embodiments, key pressure or activation force are also monitored. In one embodiment, the program includes predefined movements for specific user problems i.e., users having carpal tunnel syndrome, or predefined motions to avoid getting such problems.

In one embodiment, the program tracks keyboard usage. This data is preferably collated at a central location. By collating data, companies can determine how much a specific user is typing and use this to determine if a repetitive stress injury is possible or the result of improper keyboarding. Additionally, companies can collect data to insure that repetitive stress injury tactics are being employed be typists.

The disclosed keyboard is preferably adapted to articulate in response to user activity. The keyboard has a plurality of zones. In one embodiment, the zones are preset, i.e., two zones, each being one half of the keyboard divided about a center line, or a plurality of keys grouped by location such as Q, A, Z, W, S, X, E, D, C. In another embodiment, the zones are keys grouped by usage.

The disclosed keyboard is moved using motors, pulleys, magnets, piezoelectric elements, gears, hydraulics, pneumatics, and the like. In one embodiment, the zones are moved using telescopically extending legs. In one embodiment, the keyboard includes a base and a plurality of key zones. Each key zone is independently moveable. In another embodiment, the movement of each key zone is interrelated. In one embodiment one motion device moves each keyboard zone whereas in another embodiment, each zone is controlled via its own motion device. Alternatively, clutches are used to control which zone is moved. Motion is accomplished by moving cams under each zone, telescopically extending legs, having the zones move on ramps, spring compression and expansion, raising and lowering the zone using screw leads, and the like, and any combination of these means for moving the keyboard.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements.

Further, it should be noted that the present invention may employ any number of conventional techniques for data transmission, signaling, data processing, network control, and the like.

FIG. 10 shows another embodiment having a center pivot housing portions 19, 20 and an on/off switch 21.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

In the specification, the term "media" means any medium that can record data therein. The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the above mentioned apparatus maybe accomplished by programming functions of the above mentioned apparatuses with a programming language readable by a computer or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device, any suitable device for performing computations in accordance with a computer program may be used. Examples of such devices include a personal computer, a laptop computer, a microprocessor, a programmable logic device, or an application specific integrated circuit.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

I claim:

1. An ergonomic keyboard comprising:
   a plurality of key zones each of the plural key zones comprising a plurality of keys, the plural key zones being adapted to move with respect to at least two axes; and
   moving means, said moving means coupled to the plural key zones, the moving means configured to continuously move each of the plural key zones between a respective first work position and a respective second work position,
   wherein the key zones are moved by the moving means in a non-predefined pattern without user intervention when a predetermined condition occurs reactive to a user's physical needs and each of the plural keys in a respective key zone move synchronously,
   wherein the non-predefined pattern is based at least in part on the predetermined condition and the user's physical needs.

2. The keyboard according to claim 1, wherein the plural key zones are adapted to move independently.

3. The keyboard according to claim 1, wherein the plural key zones move in a synchronized manner.

4. The keyboard according to claim 2, wherein the predetermined condition is customized based in part on a desired motion to meet the user's physical needs.

5. The keyboard according to claim 3, wherein the predetermined condition is customized based in part on the desired motion.

6. The keyboard according to claim 1, further comprising: a controller, said controller adapted to monitor predetermined conditions including keystrokes, time, and keystroke location, said controller activating the moving means based on the predetermined conditions.

7. The keyboard according to claim 6, further comprising: a biometric sensor coupled to the keyboard to identify the user.

8. An ergonomic keyboard system comprising:
   a plurality of key zones each of the plural key zones comprising a plurality of keys, the plural key zones being adapted to move with respect to at least two axes;
   moving means, said moving means coupled to respective ones of the plural key zones to move the respective plural key zones in a non-predefined pattern between a first work position and a second work position reactive to a user's physical needs;
   a controller adapted to activate the moving means in the non-predefined pattern without user intervention in response to at least one predetermined condition based on the user's needs; and
   a computer programmed to monitor the at least one predetermined condition and provide a control signal to the controller in response to the at least one predetermined condition to meet the user's needs,
   wherein the non-predefined pattern is based at least in part on the at least one predetermined condition and the user's physical needs.

9. The keyboard according to claim 8, further comprising: a wristrest, said wristrest being adapted to change temperature from a low temperature to a high temperature.

10. The ergonomic keyboard system of claim 9, wherein the low temperature is substantially 50 degrees Fahrenheit.

11. The ergonomic keyboard system of claim 9, wherein the high temperature is substantially 100 degrees Fahrenheit.

12. The keyboard according to claim 1, wherein the continuous movements of the plural key zones include at least one of supination, pronation, flexion, extension, and rotation.

13. The keyboard according to claim 1, wherein the moving means are at least one of a motor, magnets, hydraulics, and pneumatics.

14. The keyboard according to claim 1, wherein the plurality of keys in a respective key zone are grouped by at least one of key location and key usage.

15. An ergonomic keyboard comprising:
    a stationary housing;
    a plurality of keys arranged in the stationary housing, the plurality of keys grouped into a plurality of key zones, each of the plural key zones configured to move independently between a first work position and a second work position within the stationary housing, wherein each of the groups of keys comprises at least two keys; and
    at least one drive element, the drive element configured to move each of the plural key zones in a non-predefined pattern without user intervention within the stationary housing reactive a user's physical needs,
    wherein the non-predefined pattern is based at least in part on a predetermined condition and the user's physical needs.

16. The keyboard according to claim 15, wherein the plurality of key zones are configured to move with respect to at least two axes.

17. The keyboard according to claim 1, wherein the at least two axes are substantially orthogonal axes.

18. The keyboard according to claim 17, wherein the axes are respective longitudinal and lateral axes.

19. The keyboard according to claim 17, wherein the axes are a vertical axis and at least one of a lateral axis and a longitudinal axis.

20. The keyboard according to claim 16, wherein the axes are a vertical axis and at least one of a lateral axis and a longitudinal axis.

21. The keyboard according to claim 8, wherein the computer is a server arranged at a remote location from the keyboard.

22. The keyboard according to claim 21, wherein the user's physical needs are determined by collating needs of a plurality of users.

23. An input device comprising:
    at least one motor configured to vary a position of the input device in a non-predefined pattern;
    at least one sensor configured to track a position of the input device;
    a sensing apparatus configured to monitor user motion by at least infrared motion detection; and
    a controller configured to activate the at least one motor to vary the position of the input device in the non-predefined pattern without user intervention based at least in part on data received from the sensing apparatus,
    wherein the non-predefined pattern is based at least in part on a predetermined condition and the received data.

* * * * *